United States Patent [19]

Meyer et al.

[11] 4,024,339

[45] May 17, 1977

[54] SUPPORTING INSULATOR ASSEMBLY FOR GAS-INSULATED EQUIPMENT

[75] Inventors: Jeffry R. Meyer, Pittsburgh; John S. Billings, Jr., Trafford, both of Pa.

[73] Assignee: Westinghouse Electric Corporation, Pittsburgh, Pa.

[22] Filed: June 19, 1975

[21] Appl. No.: 588,572

[52] U.S. Cl. .................... 174/21 C; 174/16 B; 174/99 B
[51] Int. Cl.² .................................... H01B 9/06
[58] Field of Search ............ 174/12 R, 16 B, 21 R, 174/21 C, 21 CA, 22 C, 28, 99 B

[56] References Cited

UNITED STATES PATENTS

| | | | |
|---|---|---|---|
| 3,331,911 | 7/1967 | Whitehead | 174/28 X |
| 3,629,486 | 12/1971 | Swampillai | 174/16 B |
| 3,652,778 | 3/1972 | Sakai | 174/28 |
| 3,809,795 | 5/1974 | Olsen | 174/28 |
| 3,898,367 | 8/1975 | Nakata | 174/99 B |
| 3,906,149 | 9/1965 | Hashoff | 174/28 |

FOREIGN PATENTS OR APPLICATIONS

| | | | |
|---|---|---|---|
| 835,291 | 12/1938 | France | 174/28 |
| 4,417,465 | 10/1966 | Japan | 174/28 |

*Primary Examiner*—Arthur T. Grimley
*Attorney, Agent, or Firm*—W. R. Crout

[57] ABSTRACT

An improved supporting insulator assembly is provided for high-voltage metal-enclosed gas-insulated equipment in which the peripheral flange portion is formed of two separate members, one member being an internal insulating spacer-member supporting the inner high-voltage conductor, and the other member being, optionally, of insulating or metallic material, and constituting an outer annular ring-shaped clamping support member, the latter being under high-loading pressure between the two confronting metallic flange portions of the outer metallic grounded casings, or pipe sections.

15 Claims, 8 Drawing Figures

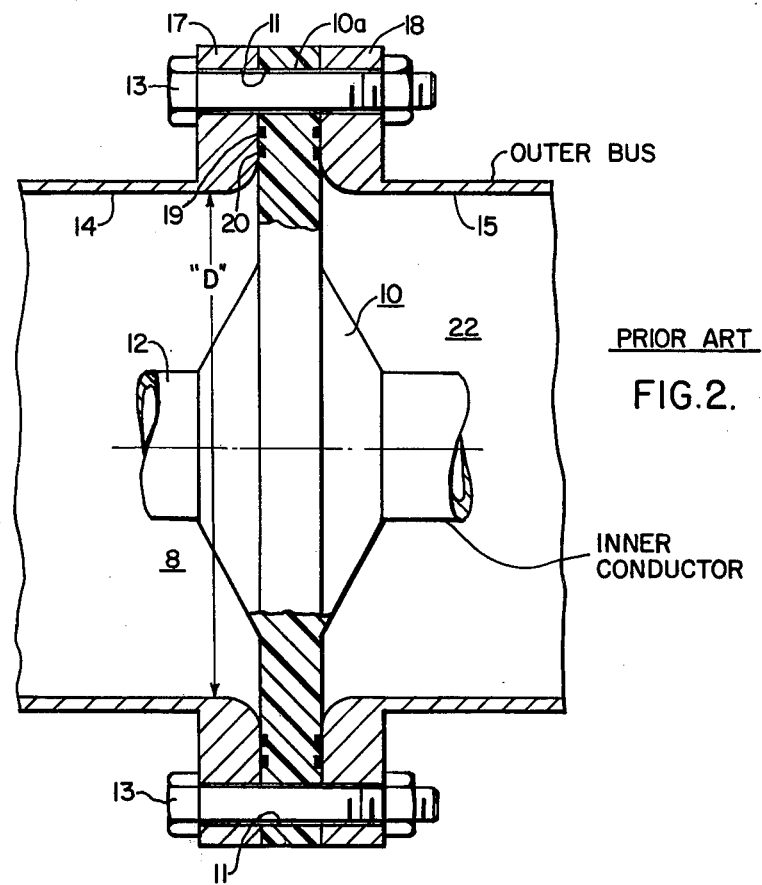
PRIOR ART
FIG. 2.
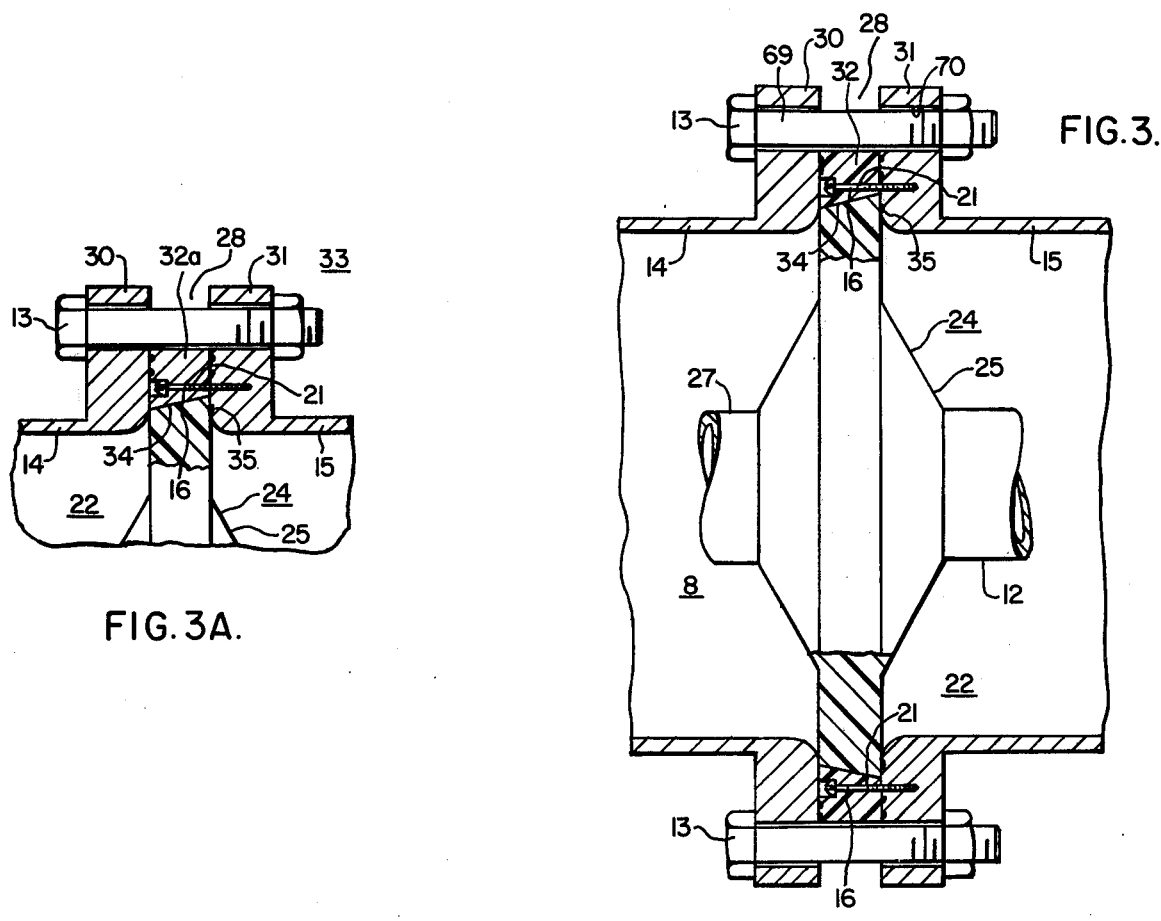
FIG. 3.
FIG. 3A.

SUPPORTING INSULATOR ASSEMBLY FOR GAS-INSULATED EQUIPMENT

Sealing means is preferably provided in connection with the outer ring-shaped clamping portion of insulating or metallic material, which, additionally, is provided with mounting-bolt holes, through which mounting bolts may pass to secure the clamping member to one of the other metallic flange portions associated with one of the outer metallic casing sections.

The inner insulating spacer member is preferably cast rigidly to the inner high-voltage cylindrical conductor, and extends radially outwardly and partly into the annular spaced between the two parallel confronting metallic flanges associated with the two outer metallic grounded casing sections. The second clamping body, concentric with the first supporting spacer element is of metallic or insulating material and extends further outwardly and actually between the parallel confronting faces of the outer casing end flanges. The outer annular ring-shaped clamping support member may, optionally, be fabricated of a suitable resinous material, or, where desired, of metal.

The interface between the two members is so shaped, or angled, such that when the outer clamping ring of insulating or metallic material is bolted to the outer metallic flange, the inner supporting spacer insulator is correspondingly held against the mating O-ring in the metallic flange of the outer casing. Thus, desirably there are no bolt holes cast or otherwise provided in the inner supporting spacer member.

An important variation of the invention is the construction in which the inner insulating spacer member may be rigidly cast to an inner metallic cylindrical sleeve, the latter being slid onto the inner high-voltage metallic bus-conductor, and suitably fastened at its periphery by the aforesaid-mentioned outer ring-shaped clamping member.

CROSS-REFERENCES TO RELATED APPLICATIONS

Reference may be made to the U.S. Pat. application filed Nov. 11, 1974, Ser. No. 522,960 by O. H. soles et al, and assigned to the assignee of the present application. Also reference may be made to U.S. Pat. application filed Sept. 17, 1974 Ser. No. 506,911, now U.S. Pat. No. 3,949,157, issued Apr. 6, 1976 to J. S. Billings et al, and also assigned to the assignee of the instant patent application. An additional patent application of interest is U.S. Pat. application filed June 10, 1975, Ser. No. 585,729 by Meyer et al, and likewise assigned to the assignee of the present invention.

BACKGROUND OF THE INVENTION

The use of gas-insulated high-voltage equipment for electrical transmission purposes is quite old. Reference may be made, for example, to U.S. Pat. No. 3,856,978, issued Dec. 24, 1974 to Andreas M. Sletten and Alan H. Cookson, and assigned to the Westinghouse Electric Corporation. In this patent are set forth certain prior art background patents relating to high-voltage component parts utilized in gas-insulated equipment. The advantages of such gas-insulated equipment are set forth in the following U.S. Pat. Nos. 3,700,840-Wilson et al; 3,694,592-Kuhn; 3,610,807-Whitehead; Canadian Pat. Nos. 904,412-Trump; 3,348,001-Upton et al and 3,378,731-Whitehead.

SUMMARY OF THE INVENTION

An improved insulating spacer-support member is provided, preferably cast to the inner high-voltage conductor, and extending radially outwardly and partly into the space between the two parallel confronting flanges of the coupling outer, grounded metallic casing sections. A second surrounding clamping body, either of insulating or of metallic material, concentric with the first said inner spacing member, extends further outwardly between the two parallel confronting flange faces, and is clamped to at least one of them. The interface between the two concentric members is so shaped, such that when the outer clamping ring, either of metallic or insulating material, is bolted to one of the outer flanges, the inner insulating support spacer is correspondingly held fixedly against the mating sealing ring provided in the outer flange face.

BRIEF DESCRIPTION OF THE DRAWINGS

FIG. 2 is a fragmentary view of a prior-art construction taken generally in vertical section;

FIG. 3 is a vertical sectional view of the improved spacer construction of the present invention;

FIG. 3A illustrates a modification of the invention in which the ring clamp is of metallic material;

DESCRIPTION OF THE PREFERRED EMBODIMENTS

Figure 1:
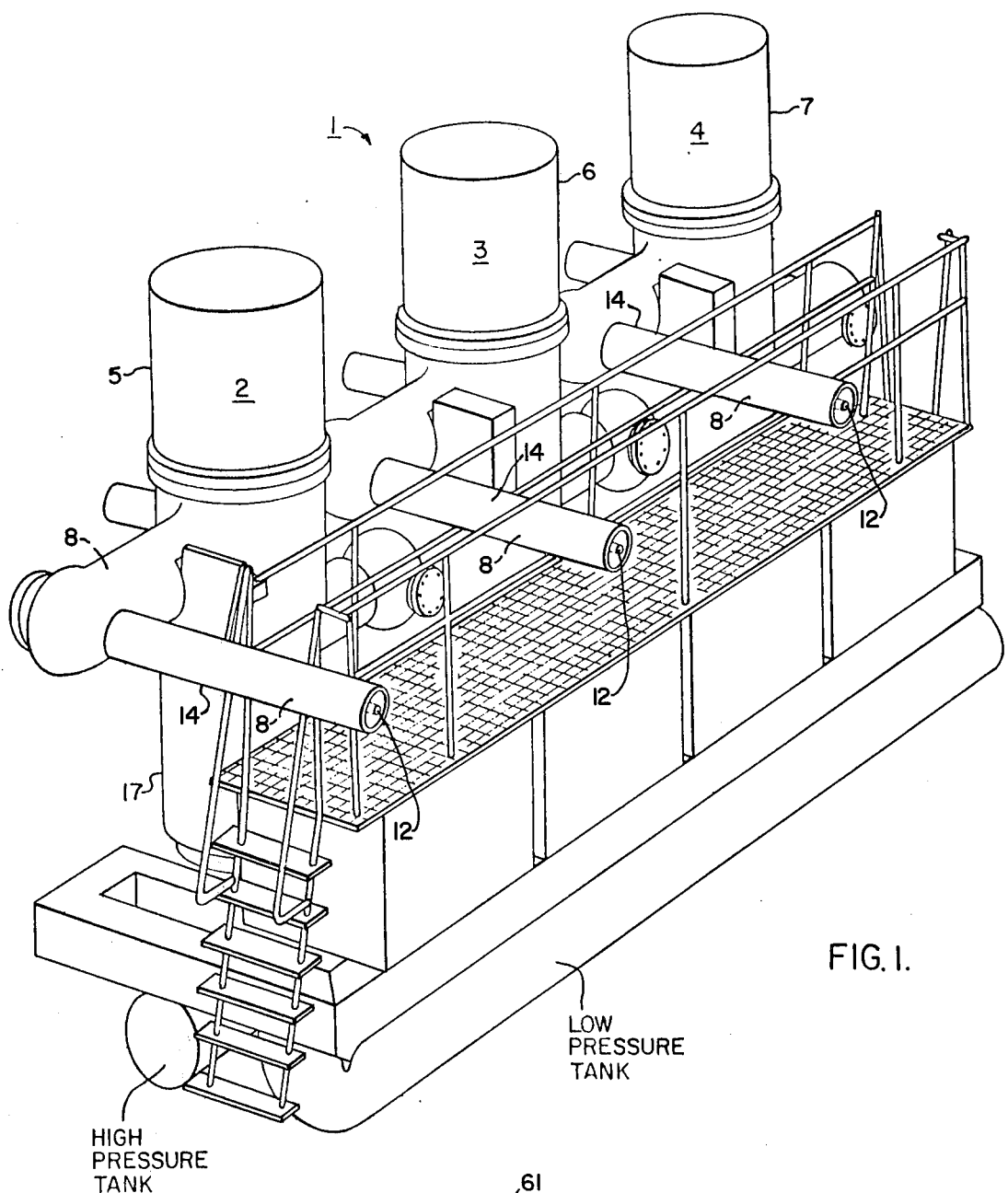
FIG. 1 is a perspective view of gas-insulated high-voltage station equipment utilizing component parts, which embody features of the present invention.

With reference to FIG. 1 of the drawings, it will be observed that there is provided a gas-insulated substation equipment 1 utilizing a plurality of circuit-breaker units 2, 3 and 4, which are enclosed within outer grounded casing structures 5, 6 and 7. Preferably, a suitable insulating gas 8, such as sulfur-hexafluoride (SF$_6$) gas, is utilized at a pressure, say, for example, 45 p.s.i.g. The construction of the circuit-breaker pole-units 2, 3 and 4 is set forth in the aforesaid U.S. patent application Ser. No. 522,960, the teachings of which are incorporated herein by reference. For the purpose of understanding the present invention, however, it is not necessary to know the detailed construction and operation of the circuit-breaker components 2, 3 or 4, and reference may be had to the aforesaid U.S. patent application Ser. No. 522,960 for an understanding of the operation of the pole-units 2, 3 and 4.

The present invention is, however, particularly concerned with the insulating spacer element 10, which assists in supporting and maintaining the high-voltage inner conductor, or bus-section 12 within the outer grounded metallic sheaths, or casing sections 14, 15, as shown in FIG. 2. As is well known by those skilled in the art, the transmission pipes, or pipe-sections 14, 15 form an outer grounded metallic sheath, or metallic casing at ground potential, interiorly of which is disposed the high-voltage conductor, or bus-section 12, and a good insulating gas 8, such as sulfur-hexafluoride (SF$_6$) gas, is provided therebetween.

With reference to FIG. 2 of the drawings, it will be observed that there is provided an inner high-voltage conductor, or bus 12 of tubular configuration having cast thereto a disc-shaped insulating spacer 10. It will be noted, with reference to FIG. 2, which shows a prior-art construction, that the outer peripheral edge portion of the spacer 10a is provided with mounting holes 11, through which pass clamping bolts 13, clamping the peripheral portion 10a between the confronting metallic outer flange faces 17 and 18 of the outer two metallic adjoining casing sections 14 and 15.

As shown in FIG. 2, the bolt holes 11 are cast into the insulator disc 10 itself, and, additionally O-ring grooves 19, 20 may be cast into the insulator 10.

Cast-resin insulators perform a very important function in the components of gas-insulated system components. They must not only perform critical mechanical duties, but must at the same time be excellent electrical insulators.

In the past, some difficulty has been encountered in the casting of the intricate shapes of the insulators 10. This is due primarily to shrinkage during curing. FIG. 2 shows a bus-support insulator 10 mounted between two conducting metallic flanges 17, 18. The cast-resin insulator 10 extends well beyond the inner diameter D of the metallic flanges 17, 18. Holes 11 are provided in the insulator 10, through which clamping bolts 13 may pass to clamp the insulator 10 to the flange assembly 17, 18. O-ring grooves 19, 20 are provided in the surfaces of the epoxy spacer for sealing the internal chamber 22 of the bus 12 from atmosphere. Oftentimes during casting of insulator configurations 10, similar to FIG. 2, cracks appeared in the O-ring grooves 19, 20 and in the bolt holes 11.

FIG. 3 illustrates the novel spacer construction 24 of the present invention. Specifically, this invention embodies an insulating body 25 preferably, although not necessarily, cast rigidly to an inner cylindrical conductor 27, and extending radially outwardly and partly into the space 28 between two parallel flanges 30, 31. A second insulating clamping body 32, concentric with the first, extends further outwardly between the parallel flanges 30, 31. The interface 34 between the two insulating bodies 25, 32 is shaped such that when the outer insulating ring 32 is bolted by bolts 21 to the flange 31 on the right, as viewed in FIG. 3, the inner insulator 25 being thereby held against the mating O-ring 35 in the flange 31.

The novel spacer configuration 24, proposed by this invention, shows considerable improvement over the prior art, as shown in FIG. 2, for the following reasons:

1. There are no O-ring grooves cast in the electrically-critical inner insulator 25.
2. There are no bolt holes 11 cast in the inner insulator 25.
3. All bolt holes and O-ring grooves are cast in the electrically-non-critical outer insulating ring 32.
4. The more-difficult-to-cast O-ring grooves and bolt holes 11 are a part of a relatively inexpensive ring 32, so that if that portion 32 of the insulating system 24 is poorly cast, or is damaged during handling or assembly, only the ring 32 is lost for use, rather than the whole insulator 24 and the inner conductor 27.
5. It is much easier and less expensive to cast intricate shapes in smaller pieces, such as the outer ring 32.
6. Smaller less-complicated molds required for this design are much less expensive and easier to use and handle.
7. The disclosed design 24 may be more easily cast without voids, which can, if present, can cause leaks or electrical problems.
8. The outer ring 32, which bears the mechanical loading pressure due to station construction and gas pressure, can be made of a relatively flexible epoxy-type material so as to minimize localized stresses in the material, and lessen the danger of cracking the ring 32.
9. The inner insulator 25, having relatively low mechanical loads imposed upon it, may be fabricated of a very brittle highly insulating epoxy-type material with little danger of breakage of this element 25.
10. The outer ring of epoxy 32 is recessed as at 29 in the space 28 (FIG. 3) with respect to the outer-most part of the outer casing coupler 30, 31 so as to be protected from external impact damage.
11. The inner insulator 25 can be provided with a seal 35 to act as an axial gas-flow barrier, necessary for switches and bus runs in some stations.
12. The inner insulator 25 can be mounted in any position rotationally, and then be semi-rigidly fixed to prevent rotation thereof during station operation. The two insulators 25, 32 are (or can be) made such that there is some free space between the outer and inner insulators 25, 32 at the interface 34 of the two. This allows some free relative motion of the inner insulator 25. Use of the seal 35 on the inner insulator 25 provides a resilient rigidizing means to allow a flexible but not slip mounting, thus further minimizing the stress on the inner insulator 25.

FIG. 3A illustrates an alternate construction 33 in which the outer ring-shaped clamping member 32a is formed of metal instead of resinous material. Holes 16 may be provided peripherally therethrough, and again clamping bolts 13 may be utilized to clamp the confronting metallic flange-sections 30, 31 of the adjacent casing-sections 14, 15 together. The other features are as described heretofore. The metallic ring 32a could be substituted for the epoxy ring 32 which acts to retain the conical insulator 25. The value of this metal ring 32a would be to:

1. Eliminate the need for grounding straps across the joint between casing sections 14 and 15.
2. Allow extremely severe environmental conditions.
3. Provide a metal ring 32a that is much less susceptible to damage from external impact and loading than on insulating spacer.
4. Allow the epoxy spacer cone 25 to be held onto the flange 31 sufficiently well that it can have a one-sided pressure of 60 psi imposed thereon without the second mating flange 30 being attached. This is useful for assembly and repair operations.

Figure 4:
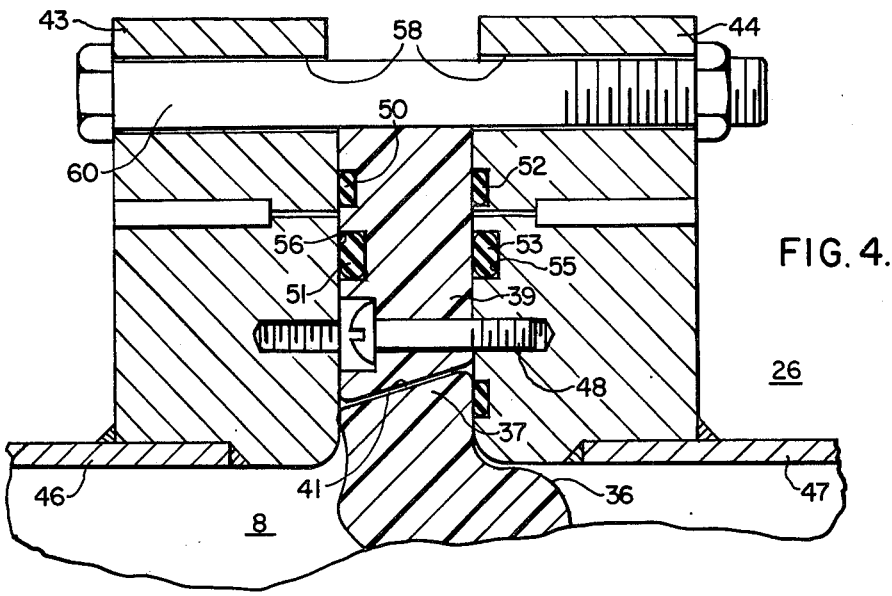
FIG. 4 is a detailed fragmentary view of the peripheral clamping construction.
Figure 5:
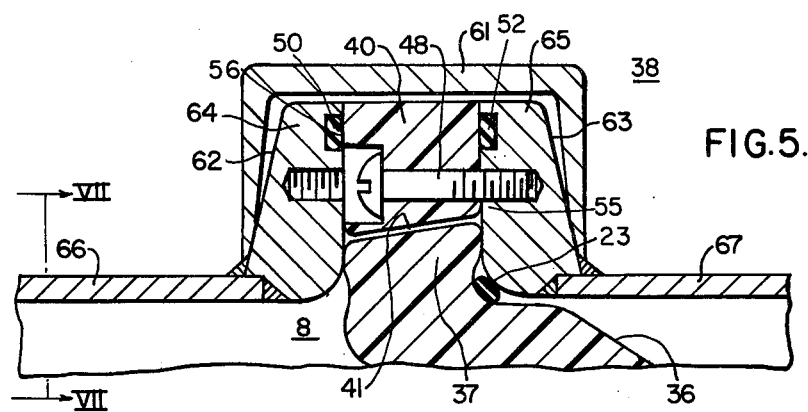
FIG. 5 illustrates a further modification of the invention, again the figure illustrating, fragmentarily, a portion of the outer clamping portion of the spacer.

FIGS. 4 and 5 illustrate alternate embodiments 26, 38 of the invention, wherein the inner disc spacer 36, which is preferably of conical, or truncated configuration, has an outer peripheral portion 37, which is clamped into position by a ring-shaped clamping element 39 or 40, having a slanting interface portion, designated by the reference numeral 41. The clamping rings 39 or 40 are bolted to one of the flange portions 44 or 65 of the outer casing 47, 67 as shown, by mounting bolts 48. Additionally, the outer clamping ring 39 or 40 has additional seals 50–53, which are clamped between the confronting flange surfaces 55 and 56 of the end metallic flange portions 43 and 44.

The flange surfaces 43 and 44, as shown in FIG. 4 are preferably provided with a plurality of circumferentially spaced mounting holes 58, through which clamping bolts 60 extend and fixedly clamp the two outer flange-rings 43, 44 together, thereby providing a fixed coupling between the two outer adjoining casing sections 46 and 47.

The seals 50-53 may be provided by grooves, as shown, into which are positioned sealing rings to prevent gas leakage. As well known by those skilled in the art, a suitable insulating gas 8, such as, for example, sulfurhexafluoride ($SF_6$) gas, at a pressure of 45 p.s.i.g., for example, is provided within the casing sections 46, 47.

Figure 7:
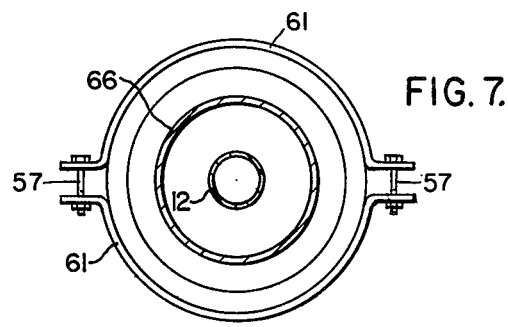

FIG. 5 shows an alternate construction 38 in which one or more grounding straps 61 clampingly engage the outer faces 62 and 63 of the two confronting flange portions 64, 65 of the outer two metallic grounded casing sections 66, 67, as shown. The grounding strap 61 may be, preferably, of channel-shaped configuration, and preferably surrounds the flanges 64, 65 at their outer peripheries 62, 63. As shown in FIG. 7, the channel ground bands 61 may be split, if desired, and clamped together by clamping bolts 57.

Gas-insulated substations have many mechanical and operational requirements. One of the components, which considerably affects the complexity and ease of assembly is the coupler design, the coupler being the method of joining two gas-insulated components 14, 15 together. The coupler must satisfy many different mechanical and electrical requirements, and frequently this results in several different couplers. The present invention, as shown in FIGS. 3–7, provides a structure which allows one coupler design without a significant cost increase.

A cast semi-flexible epoxy ring 32, 39 (or of other suitable insulating material) is used to retain an insulating support 25, when used, while still allowing rotational freedom of the support 25, during assembly operations. Shipping of the support, while attached to only one side of the coupler, is thereby made possible.

The insulating ring 32 protects the insulating support 25 from atmospheric contamination and damage due to impacts, and it bears the compression and bending load that would be born by the insulating support 25 if it were the load-bearing member. The ring is recessed with respect to the coupler to provide protection for the ring. The ring 32 is more tough and flexible and so better able to safely bear the load.

This invention allows one coupler design. For example, FIG. 5 shows that the coupler may be assembled with or without the insulating ring, and the same flanges may be used. This allows all tanks, except for bus, to be standardized, and have only the bus design changed, this being the easiest to modify.

Figure 6:
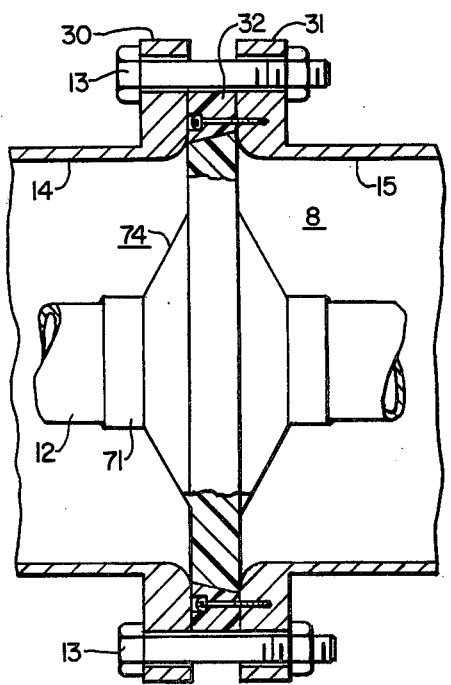
FIG. 6 illustrates still a further alternate embodiment of the inner spacing member; and, FIG. 7 illustrates a vertical sectional view of the construction set forth in FIG. 5.

Another embodiment of the invention, of alternate construction, includes the preferable casting of the inner insulating spacer member 74 to an inner metallic sleeve 71 as shown in FIG. 6. The sleeve 71 is slid onto the inner high-voltage metallic conductor 12 and supports the latter. The outer peripheral portion of said insulating spacer member 74 is the same as heretofore set forth, namely, cooperating with an outer ring-shaped clamping member 32, 32a, either of insulating or of metallic material, as desired which clamps the inner insulating spacer member 74 fixedly into position. The clamping arrangement is to preferably clamp the ring 32, 32a to the ring-shaped metallic flange portion 31 of the outer metallic grounded casing section 15.

Although there have been illustrated and described specific structures, it is to be clearly understood that the same were merely for the purpose of illustration, and that changes and modifications may readily be made therein by those skilled in the art, without departing from the spirit and scope of the invention.

What is claimed is:

1. A metal-enclosed high-voltage gas-insulated transmission line comprising an electrical inner high-voltage conductor, means defining an outer metallic enclosure comprising a confronting pair of pipe-sections each having a flange portion, the two flange portions confronting each other, an insulating spacer body (25) coaxially mounted on the inner high-voltage conductor and supporting said inner high-voltage conductor coaxially within said outer metallic enclosure, said annular spacer body (25) forming a central passage for the inner high-voltage conductor (27) and having an outer peripheral rim portion extending at least partially between the two outer confronting flange portions of the outer metallic enclosure, an outer-disposed insulating concentrically-arranged clamping ring (32) located externally of the inner spacer body 25 and having an interface therewith, and said clamping face being clamped to at least one of the outer flange portions on one of the outer pipe-sections.

2. The combination according to claim 1, wherein the said interface (34) between the outer peripheral rim portion of the inner insulating spacer body (25) and the inner portion of the outer insulating clamping ring (32) are cooperatively beveled, so as to provide mechanical blockage and support to the inner spacer body (25) when the outer ring-shaped clamping ring (32) is bolted to one of the outer flange sections.

3. The combination according to claim 1, wherein the insulating spacer body is cast to the inner high-voltage conductor.

4. The combination according to claim 1, wherein an outer-disposed channel-shaped clamping ring bears upon the outer surfaces of the two flange portions of the two outer pipe sections providing clamping pressure therebetween and also providing a ground electrical connection thereacross.

5. The combination according to claim 1, wherein said insulating spacer body is rigidly cast to an inner metallic cylindrical sleeve, the latter metallic sleeve being adapted for being slid onto the inner high-voltage metallic conductor.

6. In combination, a coupler comprising a pair of outer grounded metallic casing sections each having a flange ring, the two flange rings confronting each other, a spacer assembly (24) provided of two parts namely an inner supporting insulating spacer (25) and an independent outer-disposed clamping ring (32), said outer clamping ring (32) being disposed between the confronting faces of the two outer disposed confronting flange rings (30, 31) and fixedly secured to one of said outer flange rings.

7. The combination according to claim 6, wherein the flange rings have outer-disposed mounting holes (69, 70) extending therethrough, and fastening means extend through the outer-disposed mounting holes of the outer flange rings for fixedly clamping the two flange rings together.

8. The combination in a metal-enclosed high-voltage gas-insulated transmission line of a pair of adjoining grounded metallic pipe-sections each having a ring-shaped flange portion, the two flange portions confronting each other, a high-voltage inner conductor disposed interiorly of said casing-sections, a composite insulating spacer assembly for supporting the inner high-voltage conductor, said spacing assembly comprising two concentrically-arranged annular members one being an inner member and composed of insulating material and the other member being an outer annular member and also being of larger external diameter than said inner member and disposed radially outwardly of the said inner insulating member, said outer ring-shaped member being adapted for insertion between the confronting flange-portions of the two said adjoining pipe-sections.

9. The combination according to claim 8, wherein the outer annular member is of insulating material.

10. The combination according to claim 8, wherein the outer annular member is of metallic material.

11. A gas-insulated, grounded-pipe-type of transmission-line, comprising, in combination: means defining a pair of outer-disposed, confronting, end-to-end metallic grounded pipe-sections, each of said metallic grounded pipe-sections having an annular, coupling, mounting-flange-ring portion fixedly secured thereto at one end thereof, the two annular, coupling, mounting-flange-ring portions of the pair of end-to-end pipe-sections confronting each other so as to be adaptable for securement together, means defining an inner-disposed high-voltage, metallic conductor located axially centrally of said two pipe-sections for carrying line-current, means defining an insulating, two-part spacer-assembly having an inner first insulating supporting disc-portion and a second annular, outer-disposed ring-shaped supporting portion adaptable for insertion and clamping engagement between the two confronting, coupling, mounting-flange-ring portions of the two end-to-end disposed grounded pipe-sections, the said first and second portions of the two-part spacer-assembly defining a clamping interface portion therebetween, means removably securing said second outer-disposed ring-shaped supporting portion to at least one of the mounting-flange-ring portions of one of the pipe-sections, and said interface portion having such a beveled configuration, as to render the said first insulating supporting disc-portion captive upon the securement of said outer-disposed, second ring-shaped-supporting portion to said one mounting-flange-ring portion.

12. The combination according to claim 11, wherein the inner-disposed, first, insulating supporting disc-portion has a mounting-sleeve portion which slidably engages the inner high-voltage conductor.

13. The combination according to claim 11, wherein a pair of cooperating, split channel-shaped metallic grounded mounting rings (61) are secured together so as to provide a grounded connection between the two end-to-end pipe-sections.

14. The combination according to claim 11, wherein one or more ring-shaped seals are provided in the face of the second, annular, outer ring-shaped supporting portion to provide a gas-tight seal between said second, annular, outer-ring-shaped supporting portion and the face of the annular coupling mounting-flange-ring portion to prevent thereby loss of the contained gas.

15. The combination according to claim 11, wherein the two annular coupling mounting-flange-ring portions of the pair of end-to-end pipe-sections having a plurality of circumferentially-disposed mounting holes, and the securing means between the flange-ring portions comprises a plurality of mounting-bolts extending through said mounting holes for secure attachment.

* * * * *